United States Patent [19]

Heinrich et al.

[11] Patent Number: 4,519,537
[45] Date of Patent: May 28, 1985

[54] PROCESS FOR HYDROGEN-IMPERMEABLE BRAZING OF AUSTENITIC STRUCTURAL STEEL PARTS

[75] Inventors: Hans Heinrich, Eslingen; Dieter Hedrich, Schwabisch Gmund, both of Fed. Rep. of Germany

[73] Assignee: Daimler-Benz Aktiengesellschaft, Stuttgart, Fed. Rep. of Germany

[21] Appl. No.: 491,450

[22] Filed: May 4, 1983

[30] Foreign Application Priority Data

May 6, 1982 [DE] Fed. Rep. of Germany ....... 3216934

[51] Int. Cl.³ ........................... B23K 1/04; B23K 1/19
[52] U.S. Cl. ................................... 228/221; 220/453; 228/198; 228/248; 228/263.15; 428/677
[58] Field of Search .................. 228/226, 263.15, 221, 228/220, 154, 184, 248, 198; 428/677; 220/453

[56] References Cited

FOREIGN PATENT DOCUMENTS

| 484494 | 10/1929 | Fed. Rep. of Germany . |
| 866132 | 2/1953 | Fed. Rep. of Germany . |
| 1063010 | 8/1959 | Fed. Rep. of Germany . |
| 3022859 | 12/1981 | Fed. Rep. of Germany . |
| 617195 | 7/1978 | U.S.S.R. . |

OTHER PUBLICATIONS

Radzievski et al., "Reinforced Brass Solder for Vaccum Brazing Steel", *Automatic Welding*, Apr. 1983, pp. 48–50.

*Primary Examiner*—Kenneth J. Ramsey
*Attorney, Agent, or Firm*—Walter W. Burns, Jr.

[57] ABSTRACT

The invention relates to a process for the hydrogen-impermeable brazing of austenitic structural steel parts. These are initially loosely joined at soldering points with the addition of definite amounts of solder and soldering agent and subsequently brought to soldering temperature in a furnace under a high vacuum. In order to obtain a satisfactory wetting characteristic, on the one hand, and a good hydrogen resistance, on the other hand, a bicomponent soldering process is provided, with about 1 part by weight of nickel-base solder and about 3 parts by weight of bronze-base solder. The nickel-base solder contains about 1–3% by weight of boron and 2–5% by weight of silicon. The nickel-base solder may amount to at most about 30% by weight of solder. Such soldered joints are used for storage pipes at metal hydride reservoirs.

10 Claims, 1 Drawing Figure

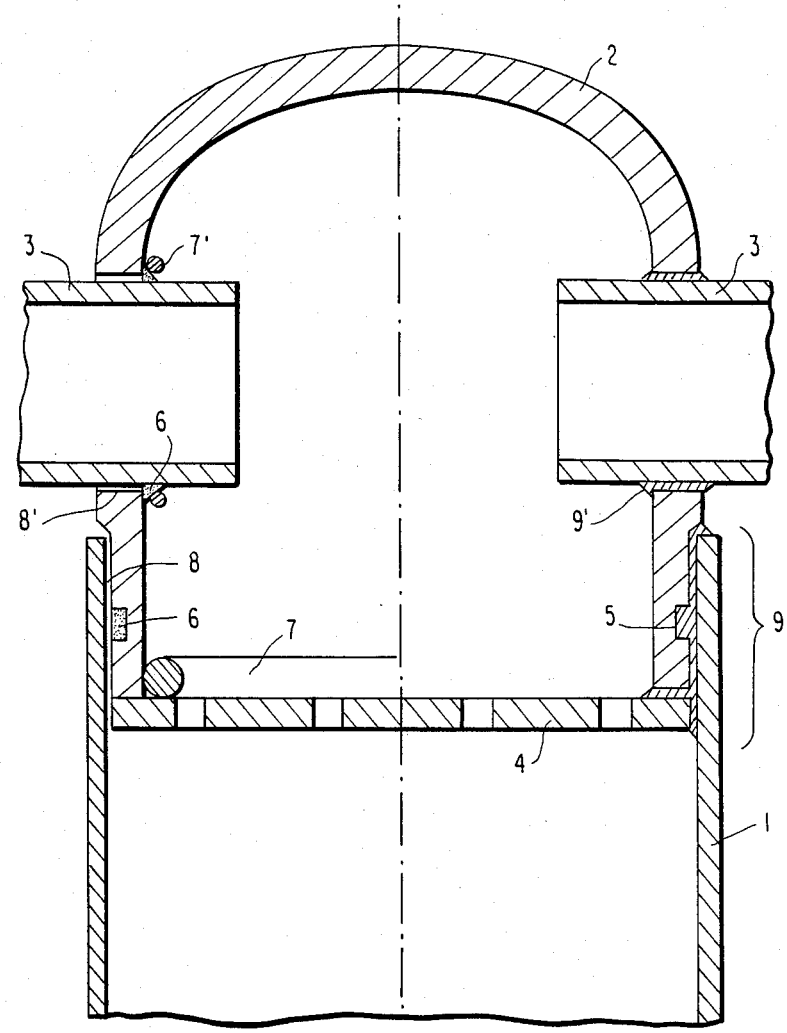

PROCESS FOR HYDROGEN-IMPERMEABLE BRAZING OF AUSTENITIC STRUCTURAL STEEL PARTS

TECHNICAL FIELD

The invention relates to a process for the hydrogen-impermeable brazing (hard-soldering) of austenitic structural steel parts. Prior art brazing is disclosed in, for example, German Offenlegungsschrift No. 3,022,859.

BACKGROUND OF THE INVENTION

One usage for such soldered joints resides in metal hydride reservoirs according to the above-mentioned laid-open application wherein pulverulent metal is stored in a plurality of parallel-connected reservoir pipes. By supplying hydrogen and removing heat, the stored material can be hydrogenated, and hydrogen can be stored. By feeding heat into the reservoir, the thus-stored hydrogen can again be released. Such reservoirs are subjected to great pressure and temperature fluctuations, and for this reason the soldered joints are exposed to high stresses. Problems are encountered in the production of hydrogen-impermeable soldered joints in case of passive austenitic structural steel parts, especially if the latter contain titanium.

Nickel solders containing boron and silicon exhibit, due to their reactivity, a good wetting characteristic on austenitic materials. Under a hydrogen atmosphere, such nickel-base solders with only small additions of an alloying element tend to form, with partial hydride formation, intercrystalline fractures of low deformation. Such nickel-base solders are unsuitable for long-term use in hydride reservoirs.

Copper-tin-base solders, due to low hydrogen solubility, exhibit high resistance against becoming brittle by hydrogen, but they show an only limited wetting characteristic on passive austenites, on account of their low reactivity.

German Pat. No. 866,132 describes a brazing method for sintered metal parts of stainless steel wherein, prior to soldering, metal is sprayed onto the soldering points to improve the tensile strength and ductility in the joints of such brittle materials. German Pat. No. 484,494 discloses a brazing method for iron and steel parts wherein the latter are plated by electrodeposition with nickel with a layer thickness of 50–200 μm prior to soldering and are thereafter soldered with a copper or bronze solder. In this process, the solder forms an alloy with the nickel, providing an especially high strength of the soldering point; besides, sluggish flow and a high soldering temperature of the copper or bronze solder are avoided. German Auslegeschrift No. 1,063,010 emphasizes that a silicon component in an alloyed bronze-base solder acts as a deoxidizing agent; other alloy components, especially nickel and silver, provide good flowability.

SUMMARY OF THE INVENTION

It is an object of the invention to develop the aforementioned process in such a way that the solder, on the one hand, shows a good wetting and flow characteristic during soldering.

But, on the other hand, it is also an object of the invention that the soldering point exhibits adequate resistance against hydrogen permeability and brittleness caused by hydrogen and has a sufficient long-term stability against fluctuating pressure and temperature stresses.

The nickel-base solder ensures good wetting of the soldering gaps due to its composition with boron and silicon. This soldering component fulfills fluxlike functions during the vacuum soldering process. On account of the oxygen affinity of boron and of silicon, the thin oxidic cover layers, which under a vacuum, are in all cases still present on the passive material surfaces, are reduced, dissolved, and eliminated. The nickel-base solder wets, due to these reactions, the soldering gaps and forms a very thin nickel alloy layer facilitating and enhancing the flow of the copper/tin-base solder. During the soldering step, the components of the copper/tin-base solder, entering the soldering gap after the nickel solder components, are greatly alloyed so that a soldering material is produced having less than 30% by weight of nickel. With this low nickel concentration in the copper/tin-base solder, brittleness occurring due to hydrogen is extensively suppressed. The austenitic structural steel part does not sustain damage by this soldering process, for there is neither the occurrence of solder brittleness nor the formation of brittle intermetallic phases. The soldering method of this invention, rather, ensures a hydrogen-tight bond between the structural parts, namely even if these parts have a complicated configuration. Besides, high strength and high ductility are obtained. The foregoing explanation is exemplary and not limiting regarding the mechanism under which the soldering takes place.

BRIEF DESCRIPTION OF THE DRAWING

The invention will be briefly explained below with reference to one embodiment illustrated in the drawing wherein the single FIGURE shows a longitudinal section through the head portion of a storage pipe of a metal hydride reservoir.

DETAILED DESCRIPTION OF THE INVENTION

The conventional metal hydride reservoirs contain a plurality of parallel-connected, horizontally arranged storage pipes 1 which, in the condition ready for operation, are filled with a pulverulent packing of metal capable of being hydrogenated. A cap 2 is sealingly soldered in place in the head portion of the storage pipes, the caps of neighboring storage pipes being in communication with one another by sealingly soldered-in connecting pipes 3. A perforated plate 4 is sealingly soldered in place in the transistion to the actual storage volume of the storage pipe, this plate serving for the purpose of retaining the dust-like storage material in the storage volume. The drawing shows a greatly enlarged cross section; in reality, the storage pipe 1 has an external diameter of merely about 30 mm and a wall thickness of about 0.7 mm. In order to provide corrosion resistance and hydrogen impermeability, the building components employed are of austenitic steel. The brazings utilized for joining these components must likewise be impermeable to hydrogen and must be absolutely tight. This tightness presupposes a good flow characteristic of the solder.

In order to join the parts by soldering, the latter are initially loosely joined at the soldering points while adding the solder and the soldering agents, and brought to soldering temperature in a furnace under a vacuum. The loosely combined condition of the structural parts, with the solders arranged in the zone of the soldering points, is illustrated to the left of the line of symmetry, shown in dot-dash lines, whereas the finished soldered condition is illustrated to the right of the line of symmetry.

According to the invention, a bicomponent high-vacuum soldering method is utilized, wherein the two solder components are, on the one hand, a nickel-base solder and, on the other hand, a conventional bronze solder with copper/tin, for example, in the ratio of 94 to 6% by weight. In this connection, the nickel-base solder employed is a soldering paste with a powder mixture of nickel, about 1–3% by weight boron and about 2–5% by weight silicon and with a conventional acrylic resin cement whereas the bronze solder is added in wire form. The nickel-base solder preferably contains about 1.8% by weight of boron, preferably about 3.5% by weight of silicon and 94.7% by weight of nickel, thus obtaining good wetting of the surfaces in the soldering gaps. Besides, the thus-alloyed soldering paste fulfills a flux-like function during the vacuum-soldering process since, due to the reactivity of boron and silicon, the thin oxidic cover layer on the surfaces of the material is dissolved and eliminated. The solder in total contains about 1 part by weight of nickel-base solder and 3 parts by weight of bronze-base solder; care must be taken to maintain this dosage. The functional capacity of the soldered joint is adversely affected if the nickel solder proportion of 30% is exceeded, because with too high a proportion of nickel in the soldered joints it is impossible to safely avoid brittleness of the material caused by hydrogen. The average nickel content in the soldering material must be kept below 30% by weight. A preferred concentration range is about 20 up to 30% by weight of the total amount of solder.

Due to the flux-like function of the nickel-base solder, the soldering paste is introduced in the closest proximity to the soldering gaps, and the wire-form bronze-base solder is introduced only therebehind or farther removed therefrom.

In order to join cap and storage pipe—soldering point or zone 9—an annular groove 5 of a defined volume is cut into the cap in the zone of the soldering gap 8 to effect exact dosing of the nickel-base solder 6. This groove is of such a dimension that the paste-like nickel-base solder filled into this groove constitutes about 25% of the entire solder of the two soldering components. The bronze-base solder 7 is provided in the form of a wire ring at the end of the soldering gap. The diameter of the wire is to be chosen so that the indicated weight ratio of nickel-base solder and bronze-base solder is maintained.

A small, exactly weighed amount of soldering paste made up of nickel-base solder, for example 60 mg, is applied at the soldering points 9' between the caps and the connecting pipes, at each place where the pipe extends through to the inside of the cap. Subsequently, each connecting pipe is provided, preferably at the other end of the soldering gap 8', with a wire ring of bronze-base solder having approximately three times the weight.

The amounts of solder are dimensioned adequately to completely fill the soldering gaps 8, 8' and for ensuring satisfactory filling of the gap even where the pipes show an untrueness in configuration and in case of machining tolerances.

Soldering is effected in a vacuum furnace under a high vacuum of about $10^{-3}$ mbar to be able to exclude oxidation of the solder and of the surface of the workpiece. The soldering temperature, depending on the boron and silicon content of the nickel-base solder, lies between 1080° C. and 1150° C. In case of relatively large parts, uniform heating of the material to be soldered is an important consideration. Heating and soldering periods must be selected accordingly. In a practical example of a furnace soldering operation, the workpiece is heated to 1130° C. within 3 hours and 40 minutes, with holding intervals of respectively 20 minutes at 500° C. and 950° C. The temperature is initially increased slowly and faster afterwards. Soldering takes place likewise within a 20-minute holding interval at 1130° C. Subsequently the workpiece is cooled down within the furnace.

The bronze-base solder need not with absolute necessity be arranged at the points indicated in the drawing. Thus, it is also possible to arrange the solder ring 7' on the outside of the cap 2—in opposition to the soldering paste. However, the illustrated arrangement proves to be suitable from the viewpoint of assembly. The large solder ring 7 can also be located at the open end face of the cap 2—in correspondence with the inner diameter of the storage pipe 1—between the cap and the perforated plate. However, in such a case the entire arrangement would have to be accommodated in the soldering furnace rotated by 180° with respect to the direction of gravity. During the melting of the solder ring disposed in such a way, the perforated plate will move along due to gravity and will closely contact the open end face of the cap 2.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A process for the hydrogen-impermeable brazing of austenitic steel parts comprising loosely joining the steel parts at soldering points, with the addition of effective amounts of solder and soldering agents adapted to the soldering point, soldering the steel parts at a soldering temperature in a furnace under vacuum, using a vacuum of up to about $10^{-3}$ mbar in the furnace and using two different solders, applying these solders separately to the soldering point, one of the solders comprising a nickel-base solder with about 1–3% by weight of boron and 2–5% by weight of silicon, and the other solder comprising a bronze solder with a copper-tin-base, wherein the nickel-base solder constitutes about 20 up to 30% by weight of the total amount of solder.

2. The process according to claim 1, further comprising using the nickel-base solder in paste form and using bronze solder with a copper-tin-base in wire form.

3. The process according to claim 2, further comprising effective dosing of the paste-like nickel base solder by filling an indentation, groove, channel, or the like adapted in volume to the required amount of the solder component and providing said solder in a soldering gap.

4. The process according to claim 2, further comprising an acrylic resin within said paste-like nickel-base solder for binding powdered metallic components of said solder.

5. The process according to claim 1, further comprising using a nickel-base solder with about 1.8% by weight boron and about 3.5% by weight silicon.

6. The product according to the process of claim 1.

7. An assembly of austenitic steel parts having a bi-component soldering composition disposed at a joint interface, said composition comprising
   (a) a nickel-base solder with about 1-3% by weight boron and about 2-5% by weight silicon, and
   (b) a bronze solder with a copper-tin base, wherein the nickel-base solder is about 20% up to 30% by weight of the total amount of solder.

8. The assembly according to claim 7, wherein the nickel-base solder is a paste and the bronze solder with a copper tin base is a wire.

9. The assembly according to claim 8, wherein the nickel base solder contains an acrylic resin cement.

10. The assembly according to claim 7, wherein the concentration of boron is about 1.8% by weight and the silicon is about 3.5% by weight.

* * * * *